(12) United States Patent
Ott et al.

(10) Patent No.: US 7,130,703 B2
(45) Date of Patent: Oct. 31, 2006

(54) VOTER LOGIC BLOCK INCLUDING OPERATIONAL AND MAINTENANCE OVERRIDES IN A PROCESS CONTROL SYSTEM

(75) Inventors: Michael G. Ott, Austin, TX (US); Gary Law, Georgetown, TX (US); Dennis Stevenson, Round Rock, TX (US); Robert Havekost, Austin, TX (US); Godfrey Sherriff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 661 days.

(21) Appl. No.: 10/409,576

(22) Filed: Apr. 8, 2003

(65) Prior Publication Data

US 2004/0255013 A1 Dec. 16, 2004

(51) Int. Cl.
*G05B 11/01* (2006.01)
*G05B 19/42* (2006.01)

(52) U.S. Cl. .............. 700/80; 700/21; 700/18; 700/86; 700/79; 700/19; 700/20; 714/1; 714/25; 714/39; 714/100; 709/203; 709/208; 709/221; 702/108; 702/188; 702/189

(58) Field of Classification Search ............ 700/18–20, 700/23, 21, 79, 80, 81, 82, 86, 87; 714/1, 714/100, 51, 39, 25; 709/221, 203, 208; 702/108, 188, 189
See application file for complete search history.

(56) References Cited

U.S. PATENT DOCUMENTS 4,427,620 A   1/1984 Cook (Continued)

FOREIGN PATENT DOCUMENTS

| EA | 1 091 199 | 4/2001 |
|---|---|---|
| GB | 2 274 929 | 8/1994 |
| WO | WO-00/38040 | 6/2000 |
| WO | WO-03/098172 | 11/2003 |

OTHER PUBLICATIONS

Search Report under Section 17(5) issued in GB 0407443.1 application by the United Kingdom Patent Office on Aug. 4, 2004.

(Continued)

*Primary Examiner*—Ramesh Patel
(74) *Attorney, Agent, or Firm*—Marshall, Gerstein & Borun LLP (57) ABSTRACT

A voter function block, which can be integrated into a function block diagram programming environment in a process plant control or safety system, implements voter logic in conjunction with providing operational and maintenance overrides which may be set to override individual inputs to the voter function block as well as to override the output of the voter function block. The voter function block, which is easy to create, use, test, debug and document, includes one or input limit detection units which detect if a particular redundant input has reached a specified limit indicating a condition within the process plant, an override unit that may be set by a user to override the consideration of that input in the voting function, a voting logic entity that determines if a trip condition exists based on the values of the valid or non-inhibited inputs, and an inhibit block that may used to override the output of the voter logic block during, for example, a startup or other operational condition. The voter function block may be integrated into a process control or safety system by being communicatively connected to other function blocks, such as to analog or digital input function blocks, analog or digital output function blocks, control function blocks, cause and effect function blocks which implement cause and effect logic, etc. Within the process control or safety programming environment.

59 Claims, 4 Drawing Sheets

U.S. PATENT DOCUMENTS

| | | | |
|---|---|---|---|
| 4,448,033 A | 5/1984 | Briccetti | |
| 5,768,119 A | 6/1998 | Havekost et al. | |
| 5,970,430 A | 10/1999 | Burns et al. | |
| 6,014,612 A | 1/2000 | Larson et al. | |
| 6,049,578 A | 4/2000 | Senechal et al. | |
| 6,155,282 A | 12/2000 | Zachary et al. | |
| 6,186,167 B1 | 2/2001 | Grumstrup et al. | |
| 6,292,523 B1 | 9/2001 | Senechal et al. | |
| 6,510,351 B1* | 1/2003 | Blevins et al. | 700/18 |
| 6,721,609 B1* | 4/2004 | Wojsznis et al. | 700/28 |
| 6,774,786 B1 | 8/2004 | Havekost et al. | |
| 6,850,973 B1* | 2/2005 | Larson et al. | 709/221 |
| 6,898,468 B1* | 5/2005 | Ott et al. | 700/21 |
| 7,010,450 B1* | 3/2006 | Law et al. | 702/108 |
| 2002/0052673 A1* | 5/2002 | Seong et al. | 700/292 |
| 2002/0091451 A1 | 7/2002 | Summers et al. | |
| 2002/0130846 A1* | 9/2002 | Nixon et al. | 345/169 |
| 2002/0145515 A1 | 10/2002 | Snowbarger et al. | |
| 2003/0062494 A1 | 4/2003 | Snowbarger et al. | |
| 2004/0193290 A1 | 9/2004 | Ott et al. | |
| 2004/0199351 A1 | 10/2004 | Ott et al. | |
| 2005/0097194 A1* | 5/2005 | Eisenbeis et al. | 709/221 |

OTHER PUBLICATIONS

Search Report under Section 17(5) issued in GB 0407444.9 application by the United Kingdom Patent Ofice on Aug. 9, 2004.

Search Report under Section 17(5) issued in GB0407892.9 application by United Kingdom Patent Office on Aug. 12, 2004.

U.S. Appl. No. 10/668,013, dated Sep. 22, 2003, "Coordination of Field Device Operations with Overrides and Bypasses Within a Process Control and Safety System.".

Abstract of JP2000047724 A, publication dated Feb. 18, 2000.

Abstract of JP59091507 A, publication dated May 26, 1984.

United Kingdom Examination Report for United Kingdom Patent Application No. 0407892.9 dated Dec. 21, 2005.

* cited by examiner

| CONFIGURED VOTING SCHEME | ONE INPUT BYPASSED (USE CONFIGURED NUM_TO_TRIP) | ONE INPUT BYPASSED (REDUCE NUM_TO_TRIP) |
|---|---|---|
| 2oo3 | 2oo2 | 1oo2 |
| 2oo2 | TRIP INHIBITED | 1oo1 |
| 1oo2 | 1oo1 | 1oo1 |
| 1oo1 | TRIP INHIBITED | TRIP INHIBITED |
| 2oo4 | 2oo3 | 1oo3 |
| 6oo8 | 6oo7 | 5oo7 |

FIG. 4

| CONFIGURED VOTING SCHEME | ALWAYS USE VALUE | WILL NOT VOTE IF BAD | VOTE TO TRIP IF BAD |
|---|---|---|---|
| 2oo3 | 2oo3 or 1oo2 | 2oo2 | 1oo2 |
| 2oo2 | 2oo2 or 1oo1 | TRIP INHIBITED | 1oo1 |
| 1oo2 | 1oo2 or TRIPPED | 1oo1 | TRIPPED |
| 1oo1 | 1oo1 or TRIPPED | TRIP INHIBITED | TRIPPED |

FIG.5

VOTER LOGIC BLOCK INCLUDING OPERATIONAL AND MAINTENANCE OVERRIDES IN A PROCESS CONTROL SYSTEM

FIELD OF TECHNOLOGY

The present invention relates generally to process control and safety systems used in process plants and, more particularly, to a system having a voter logic block with operational and maintenance override functionality.

DESCRIPTION OF THE RELATED ART

Process control systems, like those used in chemical, petroleum or other processes, typically include one or more process controllers communicatively coupled to at least one host or operator work station and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process variables. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator work station to enable an operator to perform any desired function with respect to the process, such as configuring the process, viewing the current state of the process, modifying the operation of the process, etc.

Furthermore, in many processes, a separate safety system is provided to detect significant safety related problems within the process plant and to automatically close valves, remove power from devices, switch flows within the plant, etc. When a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental nature of the event, such as closing valves, turning devices off, removing power from sections of the plant, etc. Generally, these actions include switching safety devices into a tripped or"safe" mode of operation which is designed to prevent a serious or hazardous condition within the process plant.

It is common practice in safety instrumented systems to use redundant input devices such as transmitters and switches in order to detect events within the system to provide greater safety integrity or process variable measurement availability. In such systems, it is sometimes necessary to provide voting logic functionality in the shutdown logic to determine whether the process condition is acceptable or dangerous based on the redundant inputs. While such voting logic is fairly strait-forward, in that it typically needs merely to determine a majority vote of the inputs to determine if an event condition has occurred, these voting systems have no effective overrides. However, it is frequently desirable in both safety systems and in some process control systems to be able to override the output of the voting function to, for example, prevent operation of the shut down system during startup of the process control system, enable maintenance personnel to perform maintenance operations on one or more of the input devices, allow selected process conditions to be ignored temporarily, etc.

While in the past, configuration or safety engineers have sometimes manually programmed voting logic into the safety system controllers using different programming languages, this programming step unfortunately has been tedious, time consuming and fraught with errors, which can be serious because a failure of the safety system to operate properly can lead to serious injury or even death on the part of plant personnel and to the destruction of potentially millions of dollars of equipment and material within a plant. In general, some useful features which are not easily integrated into known voting logic functionality include maintenance bypass of selected inputs to the voting logic system, startup bypasses, startup and/or trip delay features, etc.

SUMMARY OF THE DISCLOSURE

A safety system within a process plant uses one or more voter function blocks that can be easily integrated into a function block diagram programming environment to implement the voting logic specified by a user along with various maintenance overrides and bypass features. Such a voter function block, which is easy to create, use, test, debug and document, includes one or input limit detection units which detect if an associated input has reached a specified limit indicating a condition within the process plant, an input bypass unit that may be set by a user to override the consideration of that input in the voting function, a voting function logic entity that determines if a trip condition exists based on the values of the valid inputs, and an inhibit block that may used to override the output of the voter logic block during, for example, a startup or other operational condition. The voter function block may be communicatively connected to other function blocks, such as to analog or digital input function blocks, analog or digital output function blocks, control function blocks, cause and effect function blocks which implement cause and effect logic, etc. to implement the voter logic as part of a larger process control or safety system strategy. In one case, the voter function block may be used to detect the presence of an event within a process safety system based on multiple measurements of a process variable made by redundant measurement or sensor devices.

The voter function block describe herein is easy to create, as, in its basic form, it only requires the configuration or safety engineer to supply an indication of the number of inputs to be analyzed, the type of voter logic to be used and the overrides or bypass features to be used to define the desired operation of the voter function block. This voter function block is also easy to integrate into a controller or logic solver which uses function block logic as the voter function block can be integrated in the same manner as any other function block, by interconnecting inputs and outputs of the voter function block to other function blocks or elements within the control strategy. As a result, this voter function block is also easy to document, test and debug. Moreover, this voter function block may provide additional functionality not normally provided in safety systems, such as providing overrides or bypass features to be used during runtime as well as during maintenance and startup procedures.

DETAILED DESCRIPTION

Figure 1:
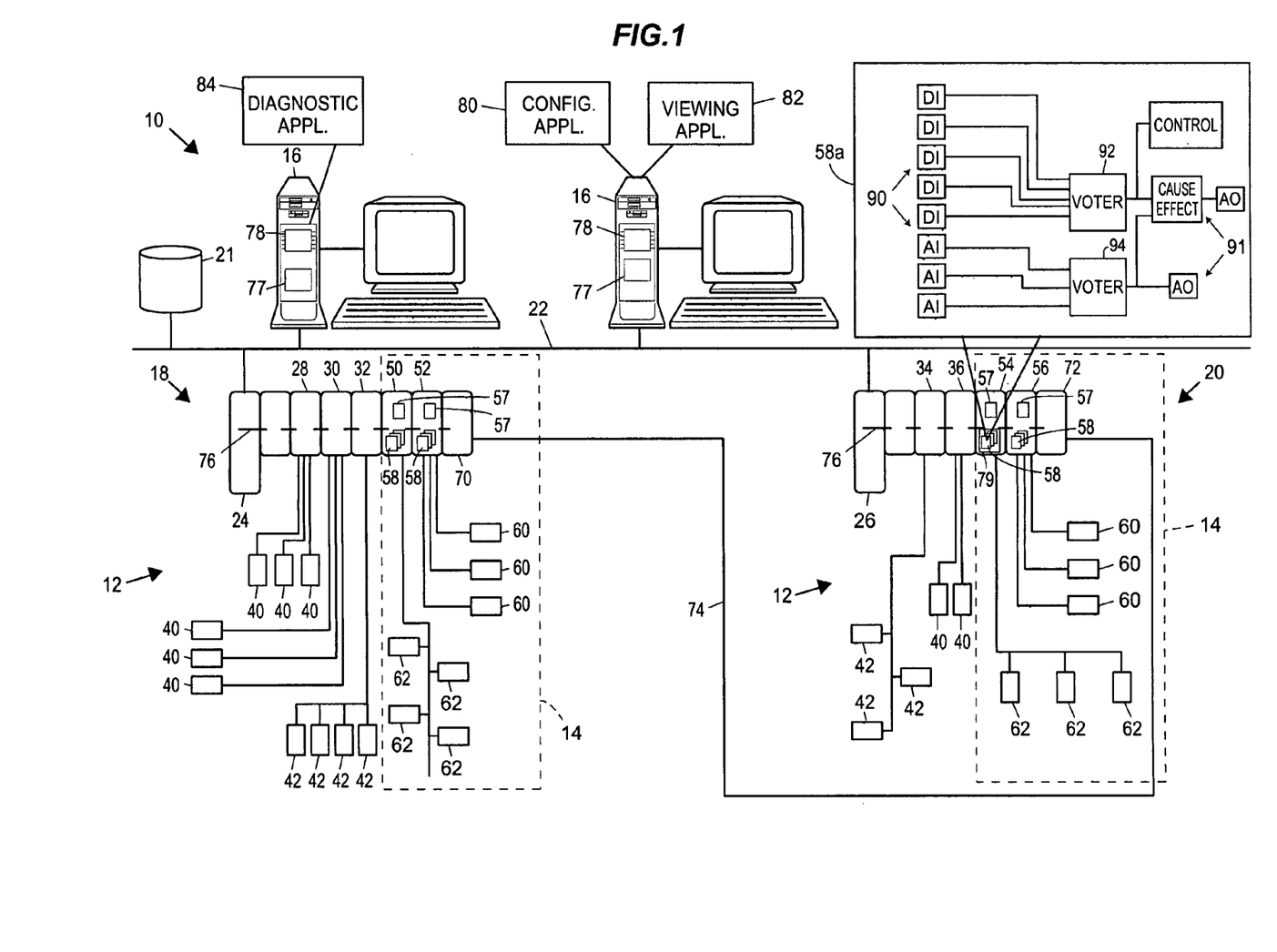
FIG. 1 is a block diagram of an exemplary process plant having a safety system that is integrated with a process control system and that uses one or more configurable voter function blocks to control the system shutdown and maintenance override activities within the process plant.

Referring now to FIG. 1, a process plant 10 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, workstations, PDAs, etc.) which are accessible by plant personnel, such as process control operators, maintenance personnel, safety engineers, etc. In the example illustrated in FIG. 1, two user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32,34 and 36 is communicatively connected to a set of process control related field devices, illustrated in FIG. 1 as field devices 40 and 42. The process controllers 24 and 26, the I/O devices 28–36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50–56 is an I/O device having a processor 57 that executes safety logic modules 58 stored in a memory 79 and is communicatively connected to provide control signals to and/or receive signals from safety system field devices 60 and 62. Additionally, each of the nodes 18 and 20 includes at least one message propagation device (MPD) 70 or 72, which are communicatively coupled to each other via a ring type bus connection 74 (only part of which is illustrated in FIG. 1). The safety system logic solvers 50–56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Fisher-Rosemount Systems, Inc., or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4–20 ma protocol (as illustrated for the field devices 40), any fieldbus protocol such as the FOUNDATIONS® Fieldbus protocol (as illustrated for the field devices 42), or the CAN, Profibus, the AS-Interface protocols, to name but a few. Similarly, the I/O devices 28–36 may be any known types of process control I/O devices using any appropriate communication protocol(s).

The safety logic solvers 50–56 of FIG. 1 may be any desired type of safety system control devices that include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4–20 ma protocol, while the safety field devices 62 are illustrated as using a bus communication protocol, such as a Fieldbus protocol. The safety field devices 60 may perform any desired function, such as that of a shut-down valve, a shut-off switch, etc.

A common backplane 76 (indicated by a dashed line through the controllers 24, 26, the I/O devices 28–36, the safety logic solvers 50–56 and the MPDs 70 and 72) is used in each of the nodes 18 and 20 to connect the controllers 24 and 26 to the process control I/O cards 28, 30 and 32 or 34 and 36, as well as to the safety logic solvers 50, 52, 54 or 56 and to the MPDs 70 or 72. The controllers 24 and 26 are also communicatively coupled to, and operate as a bus arbitrator for the bus 22, to enable each of the I/O devices 28–36, the logic solvers 50–56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 16 while a diagnostic application 84 is illustrated as being stored in the other one of the workstations 16. However, if desired, these and other applications could be stored and executed in different ones of the workstations 16 or in other computers associated with the process plant 10. Generally speaking, the configuration application 80 provides configuration information to a safety engineer and enables the safety engineer to configure some or all elements of the process plant 10 and to store that configuration in the configuration database 21. As part of the configuration activities performed by the configuration application 80, the safety engineer may create control routines or control modules for the process controllers 24 and 26, may create safety logic modules 58 for any and all of the safety logic solvers 50–56 (including creating and programming voter function blocks for use in the safety logic solvers 50–56 or even in the controllers 24 and 26) and may download these different control and safety modules to the appropriate ones of the process controllers 24 and 26 and the safety logic solvers 50–56 via the bus 22 and controllers 24 and 26. Similarly, the configuration application 80 may be used to create and download other programs and logic to the I/O devices 28–36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network," both of which are assigned to the assignee of this patent and are hereby expressly incorporated by reference herein. It will be understood, however, that the alarm display or alarm banner of these patents may receive and display alarms from both the process control system 12 and the safety system 14 in an integrated alarm display as the alarms from both systems 12 and 14 will be sent to the operator work station 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems may use the same types and kinds of parameters, security and referencing so that any data from one of the systems 12 and 14 can be integrated into a display or view traditionally provided for a process control system.

The diagnostic application 84 may be used to implement diagnostics or maintenance programs within the process control and safety system of the plant 10. Such diagnostic applications, which may perform any desired types of diagnostics or maintenance procedures, such as running process and valve tests, startup procedures, etc., may provide overrides to one or more voter function blocks (described below) used within the process plant 10 to prevent operation of the safety system based on inputs from one or more devices effected by the diagnostic procedures.

In any event, the applications 80, 82 and 84, as well as any other applications may send separate configuration and other signals to and may receive data from each of the process controllers 24 and 26 as well as from each of the safety system logic solvers 50–56. These signals may include process-level messages related to controlling the operational parameters of the process field devices 40 and 42, and may include safety-level messages related to controlling the operational parameters of the safety-related field devices 60 and 62. While the safety logic solvers 50–56 may be programmed to recognize both the process-level messages and the safety-level messages, the safety logic solvers 50–56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50–56 may employ the same or a different hardware or software design as compared to the hardware and software design used for the process control I/O cards 28–36. The use of alternate technologies for the devices within the process control system 12 and devices within the safety system 14 may minimize or eliminate common cause hardware or software failures. Furthermore, the safety system devices, including the logic solvers 50–56 may employ any desired isolation and security techniques to reduce or eliminate the chances of unauthorized changes being made to the safety-related functions implemented thereby. For example, the safety logic solvers 50–56 and the configuration application 80 may require a person with a particular authority level or a person located at a particular work station to make changes to the safety modules within the logic solvers 50–56, with this authority level or location being different from the authority or access level or location needed to make changes to the process control functions performed by the controllers 24 and 26 and the I/O devices 28–36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50–56 assess the incoming messages for proper form and security and operate as gatekeepers on changes being made to the safety-level control modules 58 executed within the safety logic solvers 50–56.

As will be understood, the use of the backplane 76 in each of the nodes 18 and 20 enables the safety logic solvers 50 and 52 and the safety logic solvers 54 and 56 to communicate locally with one another to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or nodes of the plant 10. In other words, the use of the MPDs 70 and 72 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

It will be understood that the logic solvers 50–56 may be programmed to perform control activities with respect to the safety devices 60 and 62, using a function block programming paradigm. In particular, as illustrated in an expanded view of one of the safety control modules 58a (stored in the memory 79) of the logic solver 54, a safety control module may include a set of communicatively interconnected function blocks that can be created and downloaded to the logic solver 54 for implementation during operation of the process 10. As illustrated in FIG. 1, the control module 58a includes two voter function blocks 92 and 94 having inputs communicatively interconnected with other function blocks 90, which may be, for example, analog input (AI), digital input (DI) function blocks, or other function blocks designed to provide signals to the voter function blocks 92. The voter function blocks 92 and 94 have at least one output connected to one or more other function blocks 91 which may be analog output (AO), digital output (DO), cause and effect function blocks which implement cause and effect logic, control and diagnostic function blocks which may receive output signals from the voter function blocks 92 and 94 to control the operation of the safety devices 60 and 62, etc. Of course, the safety control module 58a may be programmed in any desired manner to include any types of function blocks along with one or more voter function blocks configured in any desired or useful manner to perform any desired functionality.

While the expanded view of the safety control module 58a of FIG. 1 includes a digital voter function block 92 having five digital inputs and an analog voter function block 94 having three analog inputs, it will be understood that any number of different safety logic modules 58 can be created for and used within each of the different logic solvers 50–56 and each of these modules can include any number of voter function blocks having any desired number of inputs communicatively connected to other function blocks in any desired manner. Likewise, if used in, for example, a Fieldbus network, the voter function blocks 92 and 94, which may be any fieldbus type function blocks, or any of the other function blocks connected thereto could be located and implemented in other devices, such as in the field devices 62. If used outside of a safety system, the voter function blocks 92 and 94 could be implemented in the process controllers 24, 26, the I/O devices 28–36, the field devices 42, etc. As will be generally understood, the voter function blocks 92 and 94 receive typically redundant inputs provided by redundant sensors or transmitters within the safety system 14 and apply a voting scheme to those inputs to determine if, based on all of those inputs, a safety system trip condition exists.

Figure 2:
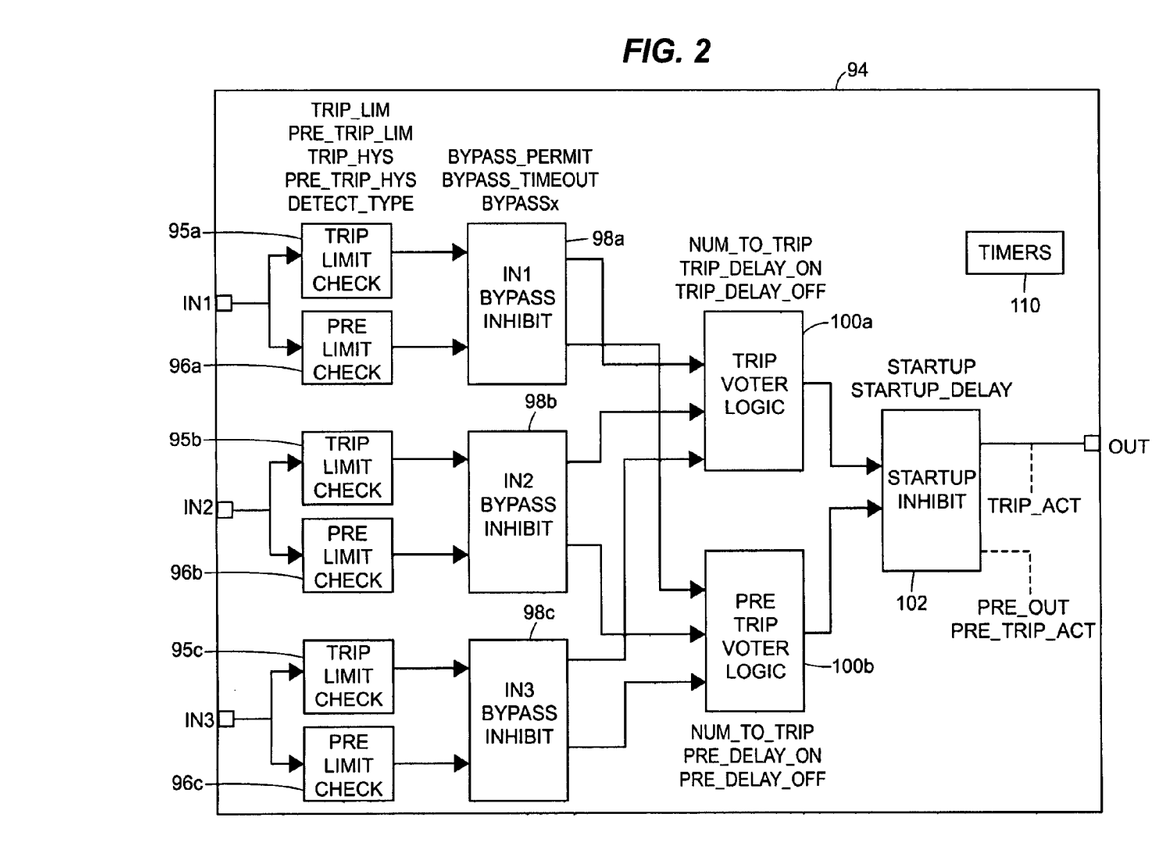
FIG. 2 is block diagram of one of the configurable voter function blocks of FIG. 1.

FIG. 2 is a block diagram illustrating the components of the example voter function block 94 of FIG. 1 which is an analog voter function block in that it processes analog input signals delivered via, for example, analog input (AI) function blocks 90. In general, the voter function block 94 includes three inputs labeled IN1, IN2 and IN3 which are adapted to receive analog input signals from, for example, redundant sensors or other redundant elements within the process plant 10 such as from the field devices 60 and 62 of FIG. 1. Each of the inputs IN1 IN2 and IN3 is-provided to one of a trip limit check block 95a, 95b or 95c and to a pre-limit check block 96a, 96b or 96c. The trip limit check blocks 95 compare the input delivered thereto to a preset limit to determine if the input signal has reached a value (which may be a high value, a low value or a value within a predetermined range) associated with a trip condition. In a similar manner, the pre-limit check blocks 96 compare the input delivered thereto to a preset pre-limit to determine if the input signal has reached a value (which may be a high value, a low value or a value within a predetermined range) associated with an alarm or a warning that indicates that a trip condition, while not yet existing, is close to existing. In effect, the pre-limit check blocks 96 enable an alarm or event signal to be created that indicates that a hazardous or otherwise undesirable condition is close to existing, even though it does not yet exist.

The outputs of the trip limit check blocks 95 and the pre-limit check blocks 96 (which may be, for example, digital signals that are set to a high valve when the limits or the pre-limits are met in the blocks 95 and 96) are each delivered to one of a set of input bypass inhibit blocks 98a, 98b and 98c. The input bypass inhibit blocks 98 perform input inhibits on the individual inputs IN1, IN2 and IN3 so that one or more of these inputs may be inhibited, that is, not used within the voter function block 94 to determine if a trip condition exists or if a pre-trip alarm condition exists. Each of the input bypass inhibit blocks 98 provides an output for the associated trip limit condition to a trip voter logic block 100a and provides an output for the associated pre-limit condition to a pre-trip voter logic block 100b. The voter logic blocks 100a and 100b perform voter logic as described in more detail below to determine if, based on the inputs thereto, a trip condition or a pre-trip alarm condition exists.

The trip voter logic block 100a and the pre-trip voter logic block 100b provide a trip signal and a pre-trip alarm signal (when these conditions are determined to exist), respectively, to a startup inhibit block 102 which may inhibit the voter function block 94 from providing any trip signal or pre-trip alarm signal output during, for example, a startup or other performance or run-time procedure in which it is desirable to inhibit the operation of the voter function block 94. The startup inhibit block 102 develops a trip output signal (labeled Out) determined as a result of the operation of the trip voter logic block 100a and the startup inhibit block logic and additionally develops a Pre_out signal determined as a result of the operation of the pre-trip voter logic block 100b and the startup inhibit block logic. The Out signal may be used to drive the operation of a shutdown procedure within the safety system 14 of FIG. 1, while the Pre_out signal may be used to provide alarming to indicate the fact that a trip condition is close to existing within the process plant 10. Of course, the Out and the Pre_out signals may be used for other purposes if so desired.

The voter function block 94 may include a set of parameters, some of which are indicated in FIG. 2 above or below the blocks in which they are used, which are set during, for example, configuration of the voter function block 94 to effect or specify the operation of the voter function block 94. In particular, a trip limit (Trip_Lim) and a pre-trip limit (Pre_Trip_Lim) parameter are used to set or establish the trip limits used in the trip limit blocks 95 and to set the pre-trip limits used in the pre-limit check blocks 96. The trip limit and/or the pre-trip limit parameters may be the same for each of the different blocks 95 and 96 or may be set individually for each of the block 95 and 96. Similarly, a trip hysteresis (Trip_Hys) and a pre-trip hysteresis (Pre_Trip_Hys) parameter are used to set the hysteresis that the blocks 95 and 96 must travel through between Successive trips. That is, once one of the blocks 95 or 96 detects one of the input signals being above (or below) a limit, the hysteresis value of the type hysteresis parameter (for the blocks 95) and the hysteresis value of the pre-trip hysteresis parameter (for the blocks 96) determine how far below (or above) the limit the input signal must travel before the trip signal (or pre-trip signal) is turned off or before enabling a second trip signal (or pre-trip signal) to be set by that block.

The voter function block 94 also has an internal trip type configuration parameter named Trip_Type which defines the normal and tripped state values associated with the inputs and/or outputs of the voter function block 94. For example, when the voter function block 94 is configured as 'De-energized to Trip' (which may be the default value), the normal operating value of the output is one and the tripped state value is zero. Conversely, when the voter function block 94 is configured as 'Energized to Trip,' the normal operating value is zero and tripped state value is one. This initial determination is made at the trip limit check blocks 95a, 95b and 95c and at the pre-limit check blocks 96a, 96b and 96c, which correspond to the inputs IN1, IN2, and IN3, respectively. A detect type (Detect_Type) parameter may be used to determine whether the comparison to the trip limit is to be a greater than (high limit) comparison or to be a less than (low limit) comparison. This comparison occurs at the appropriate trip limit check blocks 95 and the pre-limit check blocks 96 to determine if the input signals have reached the predetermined limits.

As will be understood, the outputs of the trip limit check blocks 95 will each indicate whether a trip is indicated by a corresponding one of the inputs IN1, IN2 and/or IN3. As discussed above, a maintenance override or bypass can be applied by the input bypass inhibit blocks 98 for each of the individual inputs IN1, N2 and IN3 to prevent those inputs from being used in the voting logic applied by the voter logic blocks 100. This bypass feature is desirable when, for example, maintenance is being performed on a transmitter or other field device providing the input signal to the voter function block 94. When using voting logic that determines a trip output based on multiple inputs, maintenance bypasses are not always a necessity because a single false vote to trip (that may result due to maintenance activities on the sensor providing the input) will not necessarily result in a trip. However, this bypass functionality is desirable to prevent false trips during maintenance activities and may be needed in some voter logic, such as in a one out of two voter logic scheme in which the existence of even a single trip signal from redundant sensors will result in a trip.

When one of the input bypass inhibit blocks 98 causes an input to be bypassed, the bypassed input will not be used by the voter logic blocks 100a and 100b to develop a trip signal or a pre-trip alarm signal, even if the input value exceeds the limits specified by the trip limit or the pre-trip limit parameters. To enable bypassing, a bypass permit (Bypass_Permit) parameter can first be enabled to control whether bypassing of the inputs is to be allowed in the first place. Generally speaking, bypassing on inputs will be allowed if the Bypass_Permit parameter is set or enabled while input bypassing will not be allowed if the Bypass_Permit parameter is unset or not enabled. While a single Bypass_Permit parameter may be applicable for all of the bypass inhibit blocks 98, a separate bypass permit may be set for each of input bypass inhibit blocks 98a, 98b, 98c.

If the Bypass_Permit parameter is set or enabled, then a BYPASSx parameter may be used to cause one or more of the bypass inhibit blocks 98 to operate to inhibit the use of an associated one of the inputs IN1, IN2 or IN3. The x in the BYPASSx parameter indicates which one of the inputs IN1, IN2 or IN3 is to be disabled. If desired, more than one input may be inhibited at any particular time or the voter function block 94 may be configured to allow only one input to be inhibited at a time. The Bypass_Permit and the BYPASSx parameters may be set or issued in any desired manner, such as by an operator display button on an operator or maintenance screen, a physical keyswitch, a discrete input into the safety module, by a configuration, control, display or diagnostic application or in any other manner. Of course, if the use of a bypass permit is not needed in any particular implementation of the voter function block 94, the default value of the Bypass_Permit parameter can be set to be enabled at configuration of the voter function block 94.

A bypass timeout (Bypass_Timeout) parameter may be used to set the amount of time after which a bypass for one of the blocks 98 is set that the bypass will automatically expire. In this case, each of the input bypass inhibit blocks 98 may include as one of a set of timers 110 a bypass timer that is set to the Bypass_Timeout parameter value and that may be counted down at the start of the bypass. In this case, the input bypass inhibit blocks 98 may inhibit the use of the associated input until the BYPASSx is turned off or until the bypass timer reaches zero. As will be understood, bypass timers are used to assure that bypasses are removed after a predetermined amount of time.

If desired, the input bypass inhibit blocks 98 may also be configured to provide a reminder alarm to a user, such as an operator, safety engineer, technician, etc. to remind or notify the user that a bypass timeout is imminent. If bypasses are configured to disappear or be unenabled upon a bypass timeout, notification can be sent to a user or other operator in advance of the timeout by setting a reminder time (REMINDER_TIME) parameter to some non-zero value. In this case, if the bypass timer is non-zero but is less than the reminder time parameter and any bypassed input is voting to trip, the reminder alarm can be activated to provide an alarm to the user to indicate that a shut down may occur upon expiration of the bypass timer, which is imminent. If there are no bypassed inputs voting to trip, the alarm does not need to be activated, although it may still be activated. It will be understood, however, that even when the bypass timeout alarm is active, a trip is not necessarily imminent because there may not be enough other inputs voting to trip to cause the trip voter logic block 100a to produce a trip signal.

In one embodiment, the bypass timer is re-armed only when the first bypass is timed-out. However, the bypass timer may be a write-able parameter so that, after notification that a timeout is about to occur, the bypass timer can be incremented using an operator display button (or some other suitable technique) to extend the bypass time. Such a feature enables a user to extend the bypass time when, for example, a maintenance procedure is still being performed on the field device providing the bypassed input to the voter function block 94. Alternatively, the notification of bypass timeout may be for indication purposes only when, for example, a bypass is not to be unenabled when the bypass timer times out. In this case the reminder alarm may be set to be active when the bypass timer times out, even if the reminder time parameter is set to zero. However, if the reminder time parameter is non-zero, the reminder will still occur prior to timeout (if the input is voting to trip). The reminder alarms and bypass alarms may be acknowledged or non-acknowledged alarms.

The voting logic performed by the voter logic blocks 100*a* and 100*b* is preferably configured as an "M out of N" logic function. According to this functionality, M inputs must vote to trip out of the total of N inputs. For example, the voter function block 94 can be configured as a two out of three (2oo3) voter, which means that two of the three inputs must meet the trip limit before the voter logic block 100*a* output is set to the trip state value and two out of three of the inputs must meet the pre-trip limit before the pre-trip voter logic block 100*b* is set to a pre-trip alarm value. The N value in the "M out of N" function is determined from the number uninhibited inputs while the M value is determined based on an internal parameter of the block called number to trip (NUM_TO_TRIP), whose default value may be set to any desired value equal to or less than N at configuration. Common voting schemes may include, for example, two out of three, (2oo3), one out of two (1oo2), two out of two (2oo2), etc. However, any other voting logic may be used. Because of the other features of the block 94, the voter function block 94 may also be used for single transmitter applications such as in a one out of one (1oo1) voter function logic situation.

Generally speaking, 1oo2 or 1oo1 voting schemes will need a maintenance bypass function because disabling even one of the transmitters in a maimer that causes a detected trip condition at the input of the voter function block 94 for that transmitter during maintenance activities will necessarily result in a trip condition being set by the voter logic block 100*a*. However, voter function blocks configured to require multiple votes to trip can still benefit from a bypass function for more predictable behavior during maintenance procedures.

Figure 3:
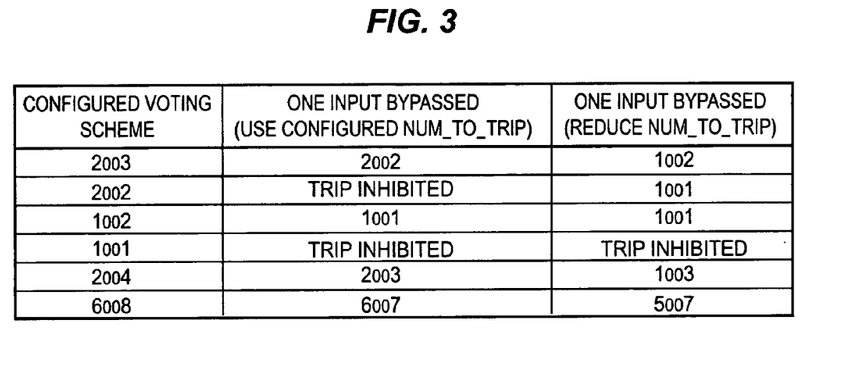
FIG. 3 is a table of several exemplary voting schemes involving one bypassed input that can be used by the voter function block of FIG. 2.

Bypassing one of the inputs IN1,IN2 or IN3 may effect the voter logic blocks 100*a* and 100*b* in one of two manners. It may either cause the number of inputs needed to determine a trip condition (or a pre-trip alarm condition) to be reduced by one or it may cause this number of inputs to remain the same. For example, when the voter logic block 100*a* is configured as a 2oo3 voter logic block and one of the inputs IN1 IN2 or IN3 is bypassed, the voting scheme may then become a 1oo2 voting scheme, meaning that the number of inputs needed to vote to trip is reduced by one (along with the number of possible inputs). Optionally, the 2oo3 voting scheme may be changed to a 2oo2 voting scheme when a selected input is bypassed, meaning that the number of inputs needed to vote to trip stays the same (even though the number of possible inputs is reduced by one). A bypass options parameter may be used to specify whether the actual number required to trip is to be reduced by one or not when an input is bypassed. FIG. 3 illustrates the effect of this option on several different voting schemes. The first column of FIG. 3 indicates the configured voting logic scheme with no inhibited inputs, the second column of FIG. 3 indicates the voting logic when a single input is inhibited using the originally configured number to trip M and the third column of FIG. 3 indicates the voting logic when a single input is inhibited and reducing the number to trip M by one. Of course, additional input inhibits could cause similar changes from the values indicated in the second and third columns of FIG. 3. In any event, the trip voter logic block 100*a* (and the pre-trip voter logic block 100*b*) will generally not reduce the actual number of inputs required for a trip to be less than one and will inhibit tripping when the possible inputs to vote to trip is reduced to zero, such as in a 1oo1 voter scheme.

The default behavior of the input bypass inhibit blocks 98 may be configured to allow only one input to be bypassed at a time. This functionality may be enforced by a writecheck feature, which prevents a second input from being bypassed. Optionally, multiple inputs can be bypassed simultaneously. If desired, the BYPASSx parameter may have an additional writecheck, which requires the bypass permit BYPASS_PERMIT parameter to be true or set before the BYPASSx parameter may be set.

After voting is performed at the trip voter logic block 100*a*, according to the selected M out of N voting scheme, a trip-delay-on time parameter TRIP_DELAY_ON may be applied so that the voted trip condition must be active for a configurable period of time (the default value of which may be set at zero seconds) before the OUT signal changes to the tripped state value. In a similar manner, a trip-delay-off time parameter TRIP_DELAY_OFF (the default value of which may be set at zero seconds) may be applied to delay the time at which the OUT signal is returned to the normal state value when the vote to trip condition clears, i.e., when the trip voter logic block 100*a* determines that a trip condition does not exist based on the inputs thereto. Of course, the trip-delay-on time parameter and the trip-delay-off time parameter may have different and any desired values, and may be applied to one or both of the Out signal produced by the trip voter logic block 100*a* and the Pre-out alarm signal produced by the pre-trip voter logic block 100*b*. If desired, the trip-delay-on time and the trip-delay-off time periods may be independently configurable for the trip voter logic block 100*a* and the pre-trip voter logic block 100*b* and may be tracked by one of the timers 110.

As indicated above, the startup inhibit block 102 provides for startup or other operational override functionality. It may, for example, be necessary to override the output of the voter function block 94 to force the Out signal to be in the normal state for a brief period of time during startup or other temporary operational situations. This startup inhibit functionality may be used, for example, to inactivate a standing trip demand generated by the voter function block 94 because the process or a relevant portion thereof is in a shutdown state, to thereby allow the process startup procedure to proceed to the point where the process values being provided at the inputs of the voter function block 94 are no longer at values that indicate that a trip should be initiated.

In one example, the startup inhibit block 102 may include default behavior such that, on receiving an indication of a startup, which may be indicated by setting a Startup parameter, the startup inhibit block 102 forces the Out signal and, if desired, the Pre_out signal to the normal state value for a configurable period of time defined by a startup delay (STARTUP_DELAY) parameter. The startup inhibit block 102 may include a startup countdown timer as one of the timers 110 which is set to the value specified by the startup delay parameter and which starts to countdown upon receiving the startup indication via the startup parameter. When the countdown timer times out, the trip voter logic block 100a and the pre-trip voter logic block 100b resume normal trip detection. The startup inhibit block 102 may be configured such that a subsequent setting of the startup parameter will not affect the startup time while the startup timer is timing down. Optionally, it is possible to allow each new setting of the startup parameter to re-arm the startup timer so that a pending trip on timeout can be avoided.

Similar to the input bypass inhibit blocks 98, the startup inhibit block 102 may have a reminder function which may be turned on by, for example, setting a bypass parameter. This reminder functionality operates for startup bypasses in essentially the same manner as it operates for input bypasses (maintenance bypasses). Thus, when the startup timer is greater than zero but less than a configurable reminder time (REMINDER_TIME) parameter (which may be set at configuration) and there are enough votes to trip, a reminder alarm condition becomes active indicating that the bypass is about to expire which will result in a shutdown based on the values of the inputs IN1, IN2 and IN3.

If desired, the startup timer may additionally or alternatively automatically expire when the inputs have stabilized, that is, when there have not been enough votes to trip for a configurable period of time. This stable time may be tracked by a stable timer which may be one of the timers 10 and which may detect when the output of the voter logic block 100a is stable at, for example, a non-trip or normal value for the specified period of time. In this case, while the startup timer is timing down, the stable timer may time up whenever there are not enough votes to trip and may reset whenever the trip votes meet or exceed the number required to trip. If the stable timer reaches the configured stable time value, the startup timer is reset to zero and the normal trip detection functionality resumes. Of course, the stable timer does not reset at the end of the startup time period, but is reset at the beginning of a startup and at any time during the startup inhibit period when there are enough trip votes.

Alternatively, the startup bypass time need not be based on a fixed time period or on values of the inputs IN1, IN2 and IN3 to the voter function block 94 but can, instead, be based on the occurrence or nonoccurrence of an event. In this case the startup bypass ends when a startup reset parameter is set or becomes set or true, which may occur upon the detection of the event. In this manner, the startup bypass may be tied to the existence or non-existence of an event of indeterminable time length.

If desired, the status of the inputs IN1, IN2 and/or IN3 may be used to influence the behavior of the voter function block 94 and this status behavior may be set using a status options parameter. As will be understood, in may systems, such in HART and Fieldbus systems, transmitters or other field devices will send a status signal along with a process variable signal or a process value, wherein the status signal indicates the status of the transmitter itself. Such status signals may indicate that the transmitter is in a normal or good state, or in an abnormal state, such as a bad or other undesirable state which may cause the value of the process variable being sent by the transmitter to be of questionable nature. Thus, the status of the inputs signals provided to the IN1,IN2 and IN3 inputs of the voter function block 94 may be determined and used to effect the voting scheme or the manner in which the inputs will be used in the voting scheme.

Figure 4:
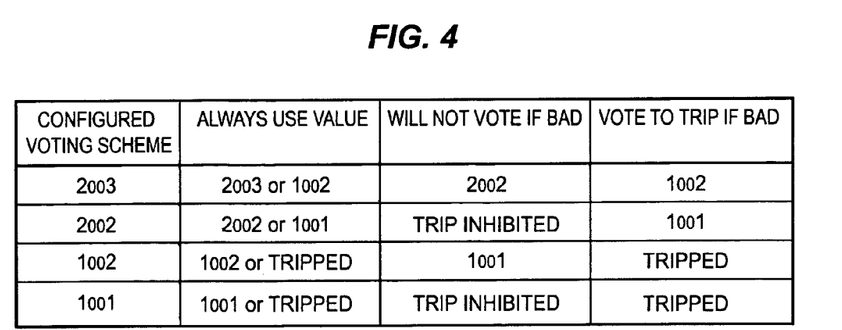
FIG. 4 is an exemplary table indicating the manner in which a voting scheme may degrade when one of the inputs to the voter function block has a bad status.

If desired, the voting schemes used by the blocks 100 may be set so that one failed transmitter (i.e., one input having a bad status) will not automatically initiate a trip when other transmitters are available to indicate a valid value of the process variable being measured. When considering the status of the input signals, one option is to always use the value of the input IN1, IN2 or IN3 regardless of the status of the input. In this manner, a hardware failure will not necessarily cause a shutdown and time will be allowed for repair. Another option is to treat a bad status on an input as if the input were bypassed, which prevents the input from voting to trip in the same manner as described above with respect to the input bypass inhibit blocks 98. A third option is to automatically consider the input as a vote to trip if the status of the input is bad. This may be configured as the default option, which provides the highest level of safety for 1ooX voting schemes. FIG. 4 illustrates the manner in which several common voting schemes degrade when a single input has a bad status for each of the options described above. For example, as illustrated in the first row and first column of FIG. 4, a 2oo3 voting scheme effectively degrades to either a 2oo3 (if the value of the signal from the bad transmitter is a non-trip value) or a 1oo2 voting scheme (if the value of the signal from the bad transmitter is a trip value) when the value of the input is always used. Conversely, as illustrated in the first row and second column of FIG. 4, the 2oo3 voting scheme degrades to a 2oo2 voting scheme if the value of the bad transmitter is not used at all (or may degrade to a 1oo2 scheme depending on the bypass feature selected). Similarly, as illustrated in the first row and the third column of FIG. 4, the 2oo3 voting scheme effectively degrades to a 1oo2 voting scheme if the value of the bad transmitter is treated as a vote to trip, no matter what the actual value of that signal may indicate.

Of course, the use of the status of the inputs to the voter function block 94 may be treated the same or differently in each of the trip voter logic block 100a and the pre-trip voter logic block 100b. If desired, the status of the Out signal and the Pre_out signal may be set as Good unless all non-bypassed inputs have a bad status, in which case, the status of the Out and the Pre-out signals may be set as Bad. If desired, when any non-bypassed input has a bad status, an alarm condition parameter indicating a bad input may be set by the voter function block 94.

Figure 5:
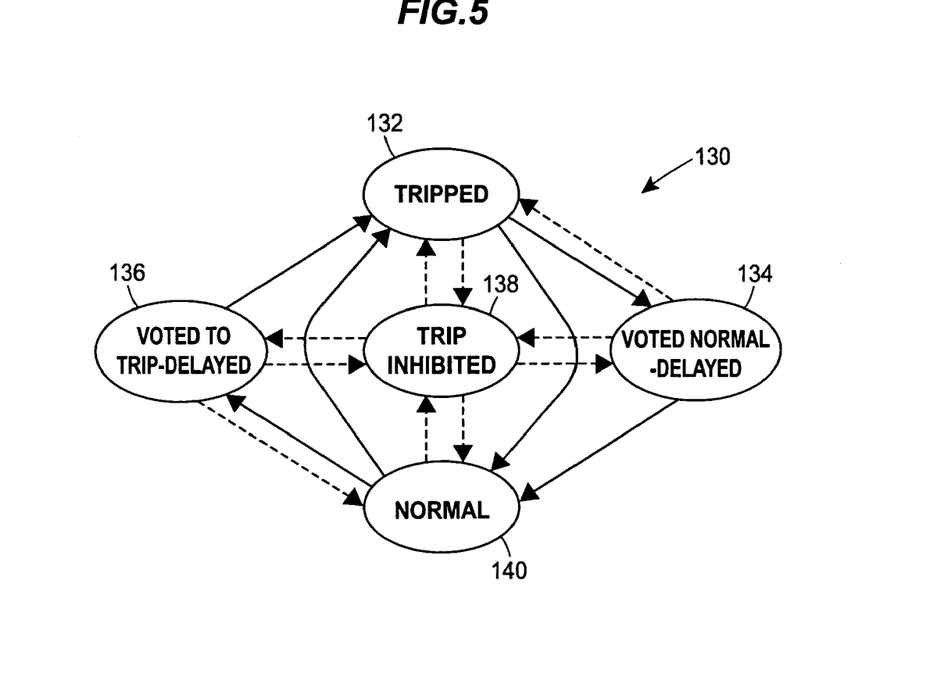
FIG. 5 is a state diagram illustrating a set of states potentially associated with the voter function block of FIG. 2.

FIG. 5 depicts a state diagram 130 illustrating different states that the voter function block 94 may cycle through to go from a tripped condition (at which the Out signal is set to the tripped state) to an untripped or normal condition (at which the Out signal is set to the normal state), or vice versa. The state diagram 130 includes five states defined as a tripped state 132, a voted normal-delayed state 134, a voted to trip-delayed state 136, a trip inhibited state 138, and a normal state 140. The arrows or lines between the states in the state diagram 130 indicate the possible state transitions between the states 132–140. The solid lines in FIG. 5 indicate the common state transitions expected as the measured process value moves above and below the trip limit. The dashed lines in FIG. 5 indicate less common state transitions.

The voter function block 94 enters the trip inhibited state 138 from any of the other states whenever a startup bypass is active or when it is not possible to trip because there are not enough inputs participating in the voting scheme, either due to one or more of the inputs being bypassed or one or more of the inputs having a bad status and a bad status is treated such that the input will not be used in the vote. The voter function block 94 may enter any other state from the trip inhibited state 138 based on the setting of the delay parameters (the trip-delay-on time parameter and the tripdelay-off time parameter) as well as the inputs to the voter function block 94 when the inhibit condition disappears.

As will be understood from the state diagram 130, the voter function block 94 will generally be in the normal state 140 when the inputs to the voter function block 94 are at values such that the voting scheme used in the trip voter logic block 100a of FIG. 2 indicates that there is not a trip condition. Of course, the trip voter logic block 100a may use all of the inputs and may use the inhibited inputs in any manner as discussed above to decide that a trip condition does not exist. When a trip condition is detected by the trip voter logic block 100a, the voter function block 94 may go directly into the tripped state 132 if no trip-delay-on time is set or may go to the voted to trip-delayed state 136 if the trip-delay-on time parameter is set to some non-zero value.

The voter function block 94 will remain in the voted to trip-delayed state 136 during the delay period, as set by the trip-delay-on time parameter, which may be configured by a user, a configuration engineer, etc. When the trip-delay-on time period times out (and is not reset by the user) and the trip condition still exists, the voter function block 94 will enter the tripped state 132 and set the Out signal to the tripped value. However, if the trip condition goes away during the vote to trip-delayed state 136, the voter function block 94 will return to the normal state 140 without effecting the Out signal.

When in the tripped state 132, the voter function block 94 sets the Out signal to the tripped state and holds it in that state until the voter function block 94 enters either the trip inhibited state 138 or the normal state 140. If a tripped condition disappears because, for example, one or more of the inputs to the voter function block 94 changes, thereby causing the trip voter logic to detect a vote not to trip condition, the voter function block 94 will go directly to the normal state 140 if trip-delay-off time period is not set, or will enter the voted normal-delayed state 134 if the trip-delay-off parameter is set to some non-zero value. The voter function block 94 will remain in the voted normal-delayed state 134 until the first of the trip-delay-off timer times out (at which time the voter function block 94 will enter the normal state 140), a trip inhibited condition arises (at which time the voter function block 94 will enter the trip inhibited state 138) or a voted to trip condition reappears based on a change in the inputs (at which time the voter function block 94 will re-enter the tripped state 132).

While the state diagram 130 of FIG. 5 illustrates one operational manner in which the voter function block 94 may transition between a normal operating state and a tripped state, and vice versa, it will be understood that the voter function block 94 could be designed to use fewer of these states or additional states or some combination of the two, if so desired. Furthermore, it will be understood that, while the state machine 130 is specifically described as being used to control the state of the Out signal, i.e., the trip signal, a similar state machine diagram could be used to describe the operation of the Pre_out signal going from a normal state to an alarmed or set state, and vice versa.

Furthermore, if desired, the voter function block 94 may provide one or more status variables or signals that indicate the trip and pre-trip state in which the voter function block 94 is disposed. A typical status value for these signals may be 'Normal' and less commonly 'Tripped'. However, as illustrated in the state diagram 130 of FIG. 5, the trip status and, if desired, the pre-trip status can take on a "Delayed" value when the trip-delay-on or the trip-delay-off parameters are set to a non-zero value and a transition is occurring between normal and tripped states. Likewise, the trip and pre-trip signals (Out and pre_out) may have an "Inhibited" status when the voter function block 94 is in the trip inhibited state 138.

If desired, the process control system 12 may be configured to capture and store information in an event chronicle regarding when inputs are bypassed or when a bypass is removed based on the signals and parameters associated with the voter function block 94. In many cases, these events may be recorded inherently because the bypass parameter is written directly to the voter function block 94. In some cases, bypasses and bypass permits are wired from physical keyswitches and special writechecking/event logging may be required. In practice, bypass permitting may be performed for a group of voter function blocks or for an individual voter function block. When bypass timeouts are used, special event logging may be used to capture the fact that the block has removed the bypasses. Of course, the voter function block 94 may generate any desired event records (by creating event record signals) to be sent to and stored in, for example, the configuration or historical database 21 of FIG. 1. Such event record or event record signals could include, for example, records of each setting or change of the bypass permit parameter, the BYPASSx parameter, bypass timeouts (typically created by the limit check blocks 95), startup overrides and startup timeouts (typically created by the startup inhibit block 102), as well as records of state changes associated with particular inputs voting to trip (or voting to pre-trip) which may be created by, for example, the voter logic blocks 100 or the trip limit check blocks 95. Such event records are valuable to users in sequence of events investigations which typically take place after a shutdown occurs in a safety system.

As can be seen, the use of the voter function block 94 as described herein makes it easy to create a function block having a known format and thus, once created, needs only to be programmed with an appropriate configuration parameter settings to provide proper operation. Implementation of the voter function block within a function block programming environment is easy because the voter function block can be created and communicatively connected to other function blocks in any known or desired manner. Likewise, debugging of the voter function block also becomes easier than voter logic created in other programming languages because the voter function block typically only needs to be debugged within the context of how it is connected within the programming environment and the configuration parameters that are sent to it. Still further, documentation of the voter function block is easy because it is a typical function block having standard documentation changed only by the individual parameter settings provided thereto.

While the voter function block 94, which is an analog voter function block, is described in detail herein, it will be understood that digital voter function blocks may operate in a similar manner. However, in a digital voter function block (which processes digital input signals), the limit check blocks or detection units 95 will merely operate to detect the value of the digital signal as being a logical one or a logical zero, wherein one of these states is defined as meeting a trip condition and the other as not meeting a trip condition. Additionally, the pre-limit check blocks or detection units 96 may not be needed or possible in digital voter function blocks as the digital input signals typically only take on one of two states and cannot be compared against some other limit between those two states. However, if desired, the outputs of the trip limit check blocks 95 may be provided to a second voter logic block (that uses a more relaxed voting scheme than the voting scheme used by the trip voter logic block 100*a*) to determine a pre-trip alarm. Additionally, while the voter function blocks 92 and 94 are described herein as including five and three inputs, respectively, any other number of inputs could be used instead.

While FIG. 1, indicates that the voter function blocks 92 and 94 receive inputs from AI, DI or other function blocks, the voter inputs may come from any other types of function blocks or may be generated as other types of signals within the process plant 10. Still further, while the outputs of the voter function blocks 92 and 94 have been illustrated as being connected to output function blocks such as AO, DO or other function blocks such as a cause and effect function block or a control routine, these outputs can be connected to any other desired type of function blocks, such as sequencer function blocks, staging function blocks, etc., or even directly to other applications or programming environments within the process plant 10. Likewise, while the logic described herein has been effected using a function block programming paradigm, the same logic can be provided in other types of programming environments and still be considered as a function block as used herein. Still further, while the voter function blocks described herein are described for use in a safety system of a process plant or process control environment, these or similar function blocks could be used in a standard process control environment or for other desired uses other than use in a safety system.

While the voter function blocks are described herein using state machine diagrams, these diagrams are only intended to describe the voter logic and bypass functionality. It will be understood that state machines need not be used and, if used, can be implemented in any form such as via hardware or software written, in any programming language. To be such a state machine, an element, such as a software program, routine, object, etc. need only cause the function block to transition between states as explained or defined herein (or other states) or as represented by the outputs of the function block to thereby cause the transition of the output from a normal to a tripped state or vice-versa.

When implemented, any of the elements described herein, including the inhibit blocks, voter logic blocks, state machines, signal connections, etc. may be implemented in software stored in any computer readable memory such as on a magnetic disk, a laser or optical disk, or other storage medium, in a RAM or ROM of a computer or process or, etc. Signals and signal lines described herein can take any form, including actual wires, data registers, memory locations, etc. This software may take any form, including application software executed on a general purpose computer or process or hard coded software burned into, for example, an application specific integrated circuit (ASIC), an EPROM, EEPROM, or any other firmware device. Likewise, this software may be delivered to a user, a process plant, an operator work station, a controller, a logic solver or any other computing device using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Of course, the voter function blocks described herein can be implemented using any external process control communication protocol (besides a Fieldbus protocol or a DeltaV protocol) and may be used to communicate with any type of function block including any function block that is similar to or the same as any of the different function blocks specifically identified by or supported by the Fieldbus protocol. Moreover, while the voter function blocks in one embodiment hereof are described as Fieldbus "function blocks," it is noted that the use of the expression "function block" herein is not limited to what the Fieldbus protocol identifies as a function block but, instead, includes any other type of block, program, hardware, firmware, etc., entity associated with any type of control system and/or communication protocol that can be used to implement some process control routine functionality or that has a predefined setup or protocol for providing information or data to other such function blocks. Thus, while function blocks typically take the form of objects within object oriented programming environment, this need not be case and can, instead, be other logical units used to perform particular control (including input and output) functions within a process plant or control environment using any desired programming structure or paradigm.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A function block entity for use in a process plant having a processor communicatively coupled to control one or more field devices, the function block entity comprising:
 a computer readable medium; and
 a function block stored on the computer readable medium and adapted to be executed on the processor, the function block including;
  a set of inputs, each input adapted to receive an input signal from within the process plant indicating a process condition;
  a limit detection unit associated with each of the set of inputs, wherein each limit detection unit produces a limit signal indicative of whether the input signal at the associated input meets a trip criterion;
  an output adapted to provide a trip signal;
  a voter logic block coupled between the limit detection units and the output, the voter logic block adapted to apply voter logic to the limit signals to produce the trip signal as a tripped value at the output when a particular number of the input signals meet the trip criterion and to produce the trip signal as a normal value at the output when the particular number of the inputs signals do not meet the trip criterion; and
  an override block adapted to prevent the use of at least one of the set of inputs by the voter logic block or to override the trip signal developed by the voter logic block at the output.

2. The function block entity of claim 1, wherein the override block is an input inhibit block that prevents the use of one of the set of inputs by the voter logic block.

3. The function block entity of claim 2, wherein the override block includes an override time parameter that specifies a first amount of time for which use of the one of the set of inputs by the voter logic block is to be prevented.

4. The function block entity of claim 3, wherein the override block includes a reminder time parameter that specifies a second amount of time prior to the expiration of the first amount of time at which a reminder signal is to be created, the reminder signal indicating the future expiration of the first amount of time.

5. The function block entity of claim 1, wherein the override block includes an input inhibit block for each of the set of inputs, wherein each inhibit block can be set separately to prevent the use of a different one of the set of inputs by the voter logic block.

6. The function block entity of claim 1, wherein the override block comprises an operational override that can be set to prevent the tripped value of the trip signal from being delivered to the output.

7. The function block entity of claim 6, wherein the override block includes a timer that tracks the time of the operational override and that times out after a predetermined time period to allow the tripped value of the trip signal to be delivered to the output.

8. The function block entity of claim 6, wherein the override block is adapted to detect when the voter logic block develops a value for the trip signal that is stable for a predetermined amount of time and that allows the trip signal value to be delivered to the output after detection that the trip signal value has been stable for the predetermined amount of time.

9. The function block entity of claim 6, wherein the override block includes an event detection parameter and uses the event detection parameter to allow the tripped value of the trip signal to be delivered to the output when the event detection parameter indicates that an event is either one of present or absent.

10. The function block entity of claim 1, wherein the override block includes an input inhibit block for each of the set of inputs, wherein each input inhibit block can be set separately to prevent the use of one of the set of inputs by the voter logic block and further includes an operational inhibit block that can be set to override the voter logic block by setting the tripped signal at the output to the normal state.

11. The function block entity of claim 1, wherein the voter logic block includes an M out of N voter logic scheme in which N is the number of inputs being considered and M is the number of limit signals that must indicate the trip criterion is met for the voter logic block to detect the existence of a trip condition and to set the trip signal to the tripped value.

12. The function block entity of claim 11, wherein the override block is an input inhibit block that prevents the use of one of the set of inputs by the voter logic block and wherein the voter logic scheme reduces the number of inputs N being considered when the one of the set of inputs is overridden but keeps the number of limit signals M the same when the one of the set of inputs is overridden.

13. The function block entity of claim 11, wherein the override block is an input inhibit block that prevents the use of one of the-set of inputs by the voter logic block and wherein the voter logic scheme reduces both the number of inputs N and the number of limit signals M in the voter logic scheme when the one of the set of inputs is overridden.

14. The function block entity of claim 11, wherein one of the input signals includes a status parameter and a value parameter and wherein one of the limit detection units uses the status parameter to decide how to treat the value parameter of the one of the input signals.

15. The function block entity of claim 14, wherein the one of the limit detection units automatically treats the one of the input signals with a bad status parameter as an input signal that meets the trip criterion.

16. The function block entity of claim 14, wherein the one of the limit detection units treats the one of the input signals with a bad status parameter as an inhibited input signal to prevent use of the one of the input signals by the voter logic block.

17. The function block entity of claim 1, further including a pre-limit detection unit associated with each of the set of inputs, wherein each pre-limit detection unit produces a pre-trip limit signal indicative of whether the input signal at the associated input meets a pre-trip criterion that is different than the trip criterion, a pre-trip output adapted to provide a pre-trip alarm signal and a pre-trip voter logic block coupled between the pre-limit detection units and the pre-trip output, the pre-trip voter logic block adapted to apply further voter logic to the pre-trip limit signals to produce the pre-trip alarm signal as a pre-trip alarm value when a particular number of the input signals meet the pre-trip criterion.

18. The function block entity of claim 1, wherein each of the inputs is adapted to receive an analog signal as the input signal.

19. The function block entity of claim 1, wherein each of the inputs is adapted to receive a digital signal as the input signal.

20. The function block entity of claim 1, wherein the override block is adapted to create an event record signal associated with an operation to prevent the use of at least one of the set of inputs by the voter logic block or to override the trip signal developed by the voter logic block at the output.

21. The function block entity of claim 1, wherein one of the limit detection units is adapted to create an event record signal indicating a change of one of the input signals between a state that meets the trip criterion and a state that does not meet the trip criterion or vice versa.

22. A control system for use in a process plant having a plurality of field devices connected within a process, the control system comprising:

a device communicatively coupled to the plurality of field devices, the device including a process or and a computer readable medium; and a voter block stored on the computer readable medium and adapted to be executed on the process or, the voter block including;

a set of inputs, each input adapted to receive an input signal from within the process plant indicating a process condition;

a limit detection unit associated with each of the set of inputs, wherein each limit detection unit produces a limit signal indicative of whether the input signal at the associated input meets a trip criterion;

an output adapted to provide a trip signal;

a voter logic block coupled between the limit detection units and the output, the voter logic block adapted to apply voter logic to the limit signals to produce the trip signal as a tripped value at the output when a particular number of the input signals meet the trip criterion and to produce the trip signal as a normal value at the output when the particular number of the inputs signals do not meet the trip criterion; and an override block adapted to prevent the use of at least one of the set of inputs by the voter logic block or to override the trip signal developed by the voter logic block at the output.

23. The control system of claim 22, wherein the voter block is a function block.

24. The control system of claim 22, wherein the override block is an input inhibit block that prevents the use of one of the set of inputs by the voter logic block.

25. The control system of claim 24, wherein the override block includes an override time parameter that specifies a first amount of time for which use of the one of the set of inputs by the voter logic block is to be prevented.

26. The control system of claim 25, wherein the override block includes a reminder time parameter that specifies a second amount of time prior to an expiration of the first amount of time at which a reminder signal is to be created, the reminder signal indicating the future expiration of the first amount of time.

27. The control system of claim 22, wherein the override block comprises an operational override that can be set to prevent the tripped value of the trip signal from being delivered to the output.

28. The control system of claim 27, wherein the override block includes a timer that tracks the time of the operational override and that times out after a predetermined time period to allow the tripped value of the trip signal to be delivered to the output.

29. The control system of claim 27, wherein the override block is adapted to detect when the voter logic block develops a value for the trip signal that is stable for a predetermined amount of time and that allows the trip signal value to be delivered to the output after detection that the trip signal value has been stable for the predetermined amount of time.

30. The control system of claim 27, wherein the override block includes an event detection parameter and uses the event detection parameter to allow the tripped value of the trip signal to be delivered to the output when the event detection parameter indicates that an event is one of present or absent.

31. The control system of claim 22, wherein the override block includes an input inhibit block for each of the set of inputs, wherein each input inhibit block can be set separately to prevent the use of one of the set of inputs by the voter logic block and further includes an operational inhibit block that can be set to override the voter logic block by setting the tripped signal at the output to the normal state.

32. The control system of claim 22, wherein the override block includes an input inhibit block for each of the set of inputs, wherein each inhibit block can be set separately to prevent the use of a different one of the set of inputs by the voter logic and wherein the override block further includes an operational inhibit block that can be set to prevent the tripped value of the trip signal from being delivered to the output.

33. The control system of claim 32, wherein the voter logic block includes an M out of N voter logic scheme in which N is the number of inputs being considered and M is the number of limit signals that must indicate that the trip criterion is met for the voter logic block to detect the existence of a trip condition and to set the trip signal to the tripped value.

34. The control system of claim 33, wherein the voter logic scheme reduces the number of inputs N being considered when one of the set of inputs is overridden by one of the input inhibit blocks but keeps the number of limit signals M the same when the one of the set of inputs is overridden by the one of the input inhibit blocks.

35. The control system of claim 33, wherein the voter logic scheme reduces both the number of inputs N and the number of limit signals M in the voter logic scheme when one of the set of inputs is overridden by one of the input inhibit blocks.

36. The control system of claim 33, wherein one of the input signals includes a status parameter and a value parameter and wherein one of the limit detection units uses the status parameter to decide how to treat the value parameter of the one of the input signals.

37. The control system of claim 36, wherein the one of the limit detection units automatically treats the one of the input signals with a bad status parameter as an input signal that meets the trip criterion.

38. The control system of claim 36, wherein the one of the limit detection units treats the one of the input signals with a bad status parameter as an inhibited input signal to prevent use of the one of the input signals by the voter logic block.

39. The control system of claim 33, further including a pre-limit detection unit associated with each of the set of inputs, wherein each pre-limit detection unit produces a pre-trip limit signal indicative of whether the input signal at the associated input meets a pre-trip criterion that is different than the trip criterion, a pre-trip output adapted to provide a pre-trip alarm signal and a pre-trip voter logic block coupled between the pre-limit detection units and the pre-trip output, the pre-trip voter logic block adapted to apply further voter logic to the pre-trip limit signals to produce the pre-trip alarm signal as a pre-trip alarm value when a particular number of the input signals meet the pre-trip criterion.

40. The control system of claim 22, wherein each of the inputs is adapted to receive an analog signal as the input signal.

41. The control system of claim 22, wherein the override block is adapted to create an event record signal associated with an operation to prevent the use of at least one of the set of inputs by the voter logic block or to override the trip signal developed by the voter logic block at the output.

42. The control system claim 41, wherein one of the limit detection units is adapted to create an event record signal indicating a change of one of the input signals between a state that meets the trip criterion and a state that does not meet the trip criterion or vice versa.

43. A method of determining the existence of a trip condition within a process plant from a plurality of redundant measurements of a process variable, the method comprising:
collecting a signal indicative of each of the redundant measurements;
determining whether each of the collected signals meets a trip criterion;
using a voter logic scheme to produce a trip signal as a normal value when the particular number of the collected signals do not meet the trip criterion and to produce the trip signal as a tripped value when the particular number of the collected signals do meet the trip criterion;
receiving an inhibit signal from a further entity within the process plant; and
preventing the use of at least one of the collected signals by the voter logic scheme or preventing the trip signal from being set to the tripped value upon receipt of the inhibit signal.

44. The method of claim 43, wherein receiving the inhibit signal includes receiving an input inhibit signal associated with one of the collected signals and wherein preventing the use of at least one of the collected signals includes preventing the use of the at least one of the collected signals within the voter logic scheme for a predetermined period of time.

45. The method of claim 44, wherein preventing the use of the at least one of the collected signals includes generating a reminder notification at a preset time before expiration of the predetermined period of time.

46. The method of claim 43, wherein preventing the use of at least one of the collected signals by the voter logic scheme or preventing the trip signal from being set to the tripped value upon receipt of the inhibit signal comprises preventing the trip signal from being set to the tripped value for a predetermined period of time.

47. The method of claim 43, wherein preventing the use of at least one of the collected signals by the voter logic scheme or preventing the trip signal from being set to the tripped value upon receipt of the inhibit signal comprises preventing the trip signal from being set to the tripped value until the voter logic scheme determines that the particular number of the collected signals do not meet the trip criterion for a specified amount of time.

48. The method of claim 43, wherein preventing the use of at least one of the collected signals by the voter logic scheme or preventing the trip signal from being set to the tripped value upon receipt of the inhibit signal comprises preventing the trip signal from being set to the tripped value until an event is detected as being one of present or absent.

49. The method of claim 43, wherein preventing the use of at least one of the collected signals by the voter logic scheme or preventing the trip signal from being set to the tripped value upon receipt of the inhibit signal comprises preventing the use of at least one of the collected signals by the voter logic scheme upon receipt of a first inhibit signal and preventing the trip signal from being set to the tripped value upon receipt of a second inhibit signal.

50. The method of claim 43, wherein using the voter logic scheme to produce a trip signal includes using a voter logic scheme that includes M out of N voting logic in which N is the number of the collected signals being considered and M is the particular number of the collected signals that must meet the trip criterion to produce the trip signal as the tripped value.

51. The method of claim 50, further including reducing the number of the collected signals N considered by the voter logic scheme when one of the collected signals is overridden as a result of the inhibit signal but keeping the particular number of collected signals M that must meet the trip criterion the same when the one of the collected signals is overridden as a result of the inhibit signal.

52. The method of claim 50, further including reducing both the number of the collected signals N considered by the voter logic scheme and the particular number of collected signals M that must meet the trip criterion when the one of the collected signals is overridden as a result of the inhibit signal.

53. The method of claim 43, wherein determining whether each of the collected signals meets the trip criterion includes using a status parameter associated with each of the collected signals to determine if the collected signals meet the trip criterion.

54. The method of claim 53, wherein using the status parameter includes automatically treating a collected signal with a bad status parameter as a collected signal that meets the trip criterion.

55. The method of claim 53, wherein using the status parameter includes automatically preventing a collected signal with a bad status parameter from being used by the voter logic scheme to produce the trip signal.

56. The method of claim 43, further including determining if each of the collected signals meets a pre-limit trip criterion, using another voter logic scheme to produce a pre-trip alarm signal as a normal value when the particular number of the collected signals do not meet the pre-limit trip criterion and to produce the pre-trip alarm signal as an alarm value when the particular number of the collected signals meet the pre-limit trip criterion.

57. The method of claim 43, wherein collecting a signal indicative of each of the redundant measurements includes collecting a separate digital signal indicative of each of the redundant measurements.

58. The method of claim 43, wherein preventing the use of at least one of the collected signals by the voter logic scheme or preventing the trip signal from being set to the tripped value upon receipt of the inhibit signal includes creating an event record signal associated with preventing the use of at least one of the collected signals or preventing the trip signal from being set to the tripped value.

59. The method of claim 43, wherein determining whether each of the collected signals meets the trip criterion includes creating an event record signal when one of the collected signals changes between a state that meets the trip criterion and a state that does not meet the trip criterion or vice versa.

* * * * *

UNITED STATES PATENT AND TRADEMARK OFFICE
CERTIFICATE OF CORRECTION

PATENT NO. : 7,130,703 B2
APPLICATION NO. : 10/409576
DATED : October 31, 2006
INVENTOR(S) : Michael G. Ott et al.

It is certified that error appears in the above-identified patent and that said Letters Patent is hereby corrected as shown below:

On the Title Page:

At field (75), 4th named Inventor, "Austin" should be --Elgin--.

At field (57), line 9, "one or input" should be --one or more input--.

At field (57), line 16, "may used" should be --may be used--.

In the Specification:

At Column 2, line 3, "strait-forward" should be --straightforward--.

At Column 2, line 36, "one or input" should be --one or more input--.

At Column 2, line 43, "may used" should be --may be used--.

At Column 8, line 17, "IN1 IN2" should be --IN1, IN2--.

At Column 8, line 17, "is-provided" should be --is provided--.

At Column 9, line 15, "block" should be --blocks--.

At Column 9, line 18, "Successive" should be --successive--.

At Column 11, line 41, "maimer" should be --manner--.

At Column 11, line 56, "IN1 IN2" should be --IN1, IN2--.

At Column 13, line 26, "timers 10" should be --timers 110--.

At Column 13, lines 51-52, "may systems, such in" should be --many systems, such as in--.

At Column 17, line 32, "written, in" should be --written in--.

At Column 17, line 49, "process" should be --processor--.

UNITED STATES PATENT AND TRADEMARK OFFICE
CERTIFICATE OF CORRECTION

| | |
|---|---|
| PATENT NO. | : 7,130,703 B2 |
| APPLICATION NO. | : 10/409576 |
| DATED | : October 31, 2006 |
| INVENTOR(S) | : Michael G. Ott et al. |

It is certified that error appears in the above-identified patent and that said Letters Patent is hereby corrected as shown below:

In the Claims:

At Column 19, line 58, "the-set" should be --the set--.

At Column 20, lien 42, "process of" should be --processor--.

At Column 20, line 45, "process of" should be --processor--.

Signed and Sealed this

Thirtieth Day of October, 2007

JON W. DUDAS
*Director of the United States Patent and Trademark Office*